US011139627B2

(12) United States Patent
Furrer

(10) Patent No.: US 11,139,627 B2
(45) Date of Patent: Oct. 5, 2021

(54) CABLE PROCESSING APPARATUS

(71) Applicant: komax Holding AG, Dierikon (CH)

(72) Inventor: Nils Furrer, Thalwil (CH)

(73) Assignee: KOMAX HOLDING AG, Dierikon (CH)

( * ) Notice: Subject to any disclaimer, the term of this patent is extended or adjusted under 35 U.S.C. 154(b) by 121 days.

(21) Appl. No.: 16/626,942

(22) PCT Filed: Jun. 30, 2017

(86) PCT No.: PCT/EP2017/066343

§ 371 (c)(1),
(2) Date: Dec. 27, 2019

(87) PCT Pub. No.: WO2019/001742

PCT Pub. Date: Jan. 3, 2019

(65) Prior Publication Data

US 2020/0136331 A1 Apr. 30, 2020

(51) Int. Cl.
*B23P 19/00* (2006.01)
*H01R 43/055* (2006.01)

(52) U.S. Cl.
CPC ...... *H01R 43/055* (2013.01); *Y10T 29/53235* (2015.01); *Y10T 29/53261* (2015.01)

(58) Field of Classification Search
CPC ............. B65H 75/403; Y10T 137/6932; Y10T 29/5193; Y10T 29/53213; Y10T 29/53235; Y10T 29/53261; Y10T 29/53265

(Continued)

(56) References Cited

U.S. PATENT DOCUMENTS 9,373,924 B2 * 6/2016 Fischer ................ H01R 43/055
10,056,729 B2 * 8/2018 Kirst .................... H01R 43/055

(Continued)

FOREIGN PATENT DOCUMENTS

DE 20 2011 107 870 U1 2/2013
EP 1 381 123 A1 1/2004

(Continued)

OTHER PUBLICATIONS

International Search Report of PCT/EP2017/066343, dated Dec. 1, 2017.

(Continued)

*Primary Examiner* — Thiem D Phan
(74) *Attorney, Agent, or Firm* — Collard & Roe, P.C.

(57) ABSTRACT

A cable processing apparatus has a crimping device loadable with an exchangeable crimping cassette, the cable processing apparatus including a crimping cassette exchanging device. The crimping cassette exchanging device includes carriages, each carriage having a crimping cassette holding device adapted to attach to and to detach from a crimping cassette; a horizontal carriage guide for providing a substantially horizontal guided movement of the carriages; a vertical carriage guide for providing a substantially vertical guided movement of a carriage from an initial vertical position to the crimping device or vice-versa, wherein the vertical carriage guide is arranged relative to the horizontal carriage guide such that one of the carriages is vertically movable at a time; a carriage shifting device adapted to controllably perform the horizontal guided movement; and a carriage lifting device adapted to controllably perform the vertical guided movement.

11 Claims, 11 Drawing Sheets

(58) Field of Classification Search
USPC ....... 29/753, 33 M, 748, 754, 759, 760, 861, 29/863
See application file for complete search history.

(56) References Cited

U.S. PATENT DOCUMENTS

| | | | |
|---|---|---|---|
| 2004/0007042 | A1 | 1/2004 | Imgrut et al. |
| 2017/0317459 | A1 | 11/2017 | Imgrut et al. |

FOREIGN PATENT DOCUMENTS

| | | | |
|---|---|---|---|
| EP | 3 240 123 | A1 | 11/2017 |
| JP | 2004-111264 | A | 4/2004 |
| WO | 2006/136930 | A1 | 12/2006 |
| WO | 2015/171845 | A2 | 11/2015 |

OTHER PUBLICATIONS

Written Opinion of the International Searching Authority of PCT/EP2017/066343, dated Dec. 1, 2017.
International Preliminary Report on Patentability of PCT/EP2017/066343, dated Oct. 7, 2019.
Written Opinion of the International Preliminary Examining Authority of PCT/EP2017/066343, dated May 31, 2019.
International Search Report of PCT/EP2017/066341, dated Dec. 1, 2017.
Written Opinion of the International Searching Authority of PCT/EP2017/066341, dated Dec. 1, 2017.
International Preliminary Report on Patentability of PCT/EP2017/066341, dated Oct. 7, 2019.
Written Opinion of the International Preliminary Examining Authority of PCT/EP2017/066341, dated Jun. 25, 2019.
Letter to European Patent Office dated Apr. 25, 2019 regarding PCT/EP2017/066341.

* cited by examiner

CABLE PROCESSING APPARATUS

CROSS REFERENCE TO RELATED APPLICATIONS

This application is the National Stage of PCT/EP2017/066343 filed on Jun. 30, 2017, the disclosure of which is incorporated by reference. The international application under PCT article 21(2) was published in English.

TECHNICAL FIELD

The present disclosure relates to a cable processing apparatus having a crimping device. The crimping device is loadable with an exchangeable crimping cassette.

BACKGROUND ART

Cable processing apparatuses comprising a crimping device loadable with crimp cassettes are known in the art. A crimp cassette comprises e. g. a crimping tool or parts of a crimping tool, as well as a magazine (a reel) of crimp contacts or the like.

EP 1 381 123 A1 discloses a crimping press in which a cassette having a reel of contacts can be inserted by hand.

WO 2006/136930 A1 discloses a crimping machine having a crimping station, the crimping station comprising a crimping tool, a tool holder, a drive unit, a contact feed and a contact store. An integrated tool unit (a reel) can be pushed into the tool holder at the crimping station. The integrated tool units can be fed and removed by means of a swivel mechanism to and from a storage rack.

DE 20 2011 107870 U1 describes a variable feeding device for a crimping aggregate. The crimping aggregate comprises a tool that is mounted on the aggregate, for crimping a contact element with a cable element. A plurality of rolls and a feeding device form a single common unit.

JP 2004 111264 A describes a terminal crimping device having single horizontal guide and a single vertical guide extending separate from one another.

WO 2006/136930 A1 describes a crimping apparatus having a lower clamping device for holding and orientation of an integrated tool unit. The integrated tool unit comprises a crimping tool, a contact strip guide, a contact strip unwinder 7 and a paper strip winder.

It is an object of the present disclosure to provide a cable processing apparatus having a crimping device which exhibits a reliable and space-efficient way for a cassette change.

BRIEF SUMMARY OF THE INVENTION

In view of the above, a cable processing apparatus according to claim 1 is provided. Further aspects, advantages, and features of the present disclosure are apparent from the dependent claims, the description, and the accompanying drawings. The aspects discussed below may be freely combined with each other, as appropriate.

According to one aspect of the disclosure, a cable processing apparatus having a crimping device loadable with an exchangeable crimping cassette is provided. The cable processing apparatus comprises a crimping cassette exchanging device. The crimping cassette exchanging device comprises a plurality of carriages, each carriage having a crimping cassette holding device adapted to attach to and to detach from a crimping cassette; a horizontal carriage guide for providing a substantially horizontal guided movement of the carriages; a vertical carriage guide for providing a substantially vertical guided movement of a carriage from an initial vertical position to the crimping device or vice-versa, wherein the vertical carriage guide is arranged relative to the horizontal carriage guide such that one of the plurality of carriages is vertically movable at a time; a carriage shifting device adapted to controllably perform the horizontal guided movement; and a carriage lifting device adapted to controllably perform the vertical guided movement.

Throughout this disclosure, it is assumed that the cable processing apparatus is in an operational position in which a cable processing operation can be performed. Thus, as used herein, the vertical movement is a movement substantially in the vertical direction relative to the cable processing apparatus in its operational position, and the horizontal movement is a movement substantially in a plane which is orthogonal to the vertical direction.

A guided movement, as used herein, is a movement which is restricted or forced, by suitable guiding means, into the desired direction. A non-limiting example for a guiding means is a guiding rail.

The horizontal carriage guide provides a substantially horizontal guided movement of the carriages. The horizontal guided movement may be a rectilinear or a curved movement; yet, it is substantially performed in a plane which is orthogonal to the vertical direction. The horizontal guided movement is performed substantially on the same vertical level. This level may be substantially a ground level of the crimping cassettes attached to the carriages. A ground level includes both a level in which the crimping cassettes have a contact with the ground, e. g. by means of a suitable roller, or a level in which the crimping cassettes are slightly lifted, e. g. by a few centimeters, but still in the vicinity of the ground.

By the horizontal guided movement, one carriage at a time may be brought into a horizontal position from which it is moveable along the vertical carriage guide. This carriage is referred to as a vertically moveable carriage.

The initial vertical position of the vertically moveable carriage may be a position in which the respective carriage is on a vertical level which corresponds to the vertical level of the horizontal guided movement. The vertically moveable carriage which can be moved along the vertical carriage guide out of the initial vertical position to a vertical position, or vertical level, in which a cassette loading or unloading operation of a crimping cassette to or from the crimping device is possible.

After having been moved back to the initial vertical position, the vertically moveable carriage may be horizontally moved again, along the horizontal carriage guide, out of the position in which a vertical guided movement of this carriage can be performed. Then, for example, another carriage of the plurality of carriages may be moved along the horizontal carriage guide to become the vertically moveable carriage.

The horizontal guided movement is controllably performed by a carriage shifting device, such as, without limitation, a linear drive or a controllable pneumatic cylinder. Likewise, the vertical guided movement is controllably performed by a carriage lifting device, such as, without limitation, a linear drive or a controllable pneumatic cylinder, typically a rodless cylinder.

Thus, different carriages may be moved to and from the crimping device. Each of the different carriages may have attached thereto a crimping cassette with suitable crimping contacts according to the needs for the cable processing operation to be performed. In the position at the crimping device, the crimping cassette releaseably attacheable to the carriage may be loaded to or unloaded from the crimping device.

In some embodiments, the crimping cassette exchanging device is directly attached to, or fixed on, the cable processing apparatus. Multiple carriages can be attached, or provided, directly at the apparatus. Some or each of the carriages may have assigned a specific crimping cassette. Thus, the crimping cassettes can be readily selected and exchanged, without the need of additional storing racks for the cassettes. Furthermore, no complicated and fault-prone swiveling mechanism is needed.

In this way, the cable processing apparatus as disclosed herein allows an easy, reliable and space-efficient way of automatically changing the crimping cassette.

According to a further aspect of the disclosure, the cable processing apparatus further comprises a control device adapted to control the horizontal guided movement according to a carriage selection signal. Additionally or alternatively, the control device is adapted to control the vertical guided movement according to a carriage selection signal.

The carriage selection signal is indicative of one specific carriage out of the plurality of carriages which is to be driven to the crimping device. As such, the carriage selection signal may be indicative of a particular crimping cassette or a particular type of crimping cassette, provided the corresponding carriage which holds the respective crimping cassette is known. The carriage selection signal may be generated by the cable processing device itself or by a higher level control, and it may be supplied to the control device. Typically, the carriage selection signal is generated according to the need of the cable processing apparatus at a particular point in time, such as a type of crimp contacts to be processed and/or a type of crimping tool to use in the cable processing operation.

The control device may be configured such that it controls the carriage shifting device and/or the carriage lifting device according to the carriage selection signal. A control device may thus provide a way to automatically select and load a particular crimping cassette or a particular type of crimping cassette to the crimping device.

According to a further aspect of the disclosure, the carriages each comprising a coupling mechanism having mutually matching counterparts to couple to neighboring ones when each of the respective neighboring carriages is in its respective initial vertical position, wherein the coupling mechanism is designed such that the counterparts are detacked from one another when any one of the neighboring carriages is lifted from its respective initial vertical position.

In this way, when shifting the plurality of carriages (when performing the guided horizontal movement), all carriages of the plurality of carriages are moved together which allows for both a push and a pull operation which each acts on any one of the coupled carriages. The counterparts detach from one another without any further action just by lifting a carriage from its initial vertical position. Likewise, a detached carriage attaches, with its respective counterparts, to the plurality of carriages again when it is lowered again into its initial vertical position, e. g. after a cassette has been unloaded from the crimping device and the carriage lifting device has brought the carriage with the cassette to its initial vertical position again.

According to a further aspect of the disclosure, wherein the horizontal carriage guide comprises at least a first horizontal guiderail and at least a second horizontal guiderail arranged such that a horizontal gap is provided in between the horizontal guiderails in the horizontal direction, the vertical carriage guide being arranged such that it extends, at least partially, through the horizontal gap. This allows for a particularly space-efficient and convenient solution. In particular, carriages with attached crimping cassettes substantially on the ground level may be present on both sides of the vertical carriage guide, and the carriages may be freely selected.

In some embodiments, the gap width of the horizontal gap substantially corresponds to a total width of a carriage in the horizontal direction. Thus, an unaffected or unhindered vertical guided movement of a vertically moveable carriage is performed.

According to a further aspect of the disclosure, the crimping cassette holding device comprises a clamping holder for attaching to the crimping cassette. By means of a clamping holder, an attaching or detaching operation of the crimping cassette can be easily and reliably performed. An easy attaching or detaching operation of the crimping cassette is particularly desirable in an automatic crimping cassette exchanging operation at the crimping device. Furthermore, the crimping cassette can easily be replaced by a different one when it is lowered, i. e. in its initial vertical position. In some embodiments, the crimping cassette holding device is adapted to lift the crimping cassette for attaching it to the clamping holder.

According to a further aspect of the disclosure, the carriage shifting device is operated pneumatically. Additionally or alternatively, the carriage lifting device is operated pneumatically. A pneumatic operation comprises e. g. a pneumatic device being operated, such as, without limitation, a double-acting pneumatic cylinder forcing a piston into the desired direction. The desired direction may be any one of the upward direction and the downward direction of substantially vertical movement in the case of the carriage lifting device, and it may be any one of the left-right substantially horizontal direction in the case of the carriage shifting device. In some embodiments, the pneumatic cylinder is a rodless pneumatic cylinder.

A pneumatic operation, as used in this context, includes a suitable electric driving or triggering of the respective device which is operated pneumatically, e. g. by means of a control device or the like.

According to a further aspect of the disclosure, the carriage shifting device is operated electrically. Additionally or alternatively, the carriage lifting device is operated electrically. An electrical operation comprises e. g. a linear drive being operated, such as, without limitation, a linear motor.

It is to be understood that the above features concerning a pneumatic operation or an electrical operation can be reasonably combined among the carriage shifting device and the carriage lifting device. For example, when the carriage shifting device is operated pneumatically, the carriage lifting device may also be operated pneumatically, or the carriage lifting device may be operated electrically. For example, when the carriage lifting device is operated pneumatically, the carriage shifting device may also be operated pneumatically, or the carriage shifting device may be operated electrically. For example, when the carriage shifting device is operated electrically, the carriage lifting device may also be operated electrically, or the carriage lifting device may be operated pneumatically. For example, when the carriage lifting device is operated electrically, the carriage shifting device may also be operated electrically, or the carriage shifting device may be operated pneumatically.

According to a further aspect of the disclosure, each carriage comprises an arresting device for releaseably arresting at least one carriage with the carriage lifting device. By way of example and not by limitation, the arresting device may be a locking cylinder or locking bolt which can be controllably extended and retracted into a mating part of the carriage lifting device when the respective carriage is in its initial vertical position.

According to a further aspect of the disclosure, the crimping device comprises a locking device for releaseably locking a loaded crimping cassette. A locking device may help ensure that a crimping cassette is reliably locked in an operational position on the crimping device for performing a crimp operation.

In some embodiments, the locking device comprises a centering unit for centering the loaded crimping cassette. In some embodiments, a centering hole is provided on the locking device as a centering unit or as part of a centering unit. In some embodiments, the centering unit, such as the centering hole, is adapted to mate with a corresponding centering counterpart provided on the crimping cassette. In some embodiments, the centering counterpart is a centering bolt. In some embodiments, the centering hole is provided on the crimping cassette, and the centering bolt as the respective counterpart is provided on the locking device.

BRIEF DESCRIPTION OF THE DRAWINGS

The subject matter of the disclosure will be explained in more detail with reference to preferred exemplary embodiments which are illustrated in the accompanying drawings. In the drawings, like reference numerals are assigned to like or corresponding parts.

In the drawings.

DETAILED DESCRIPTION OF THE EMBODIMENTS

Figure 1:
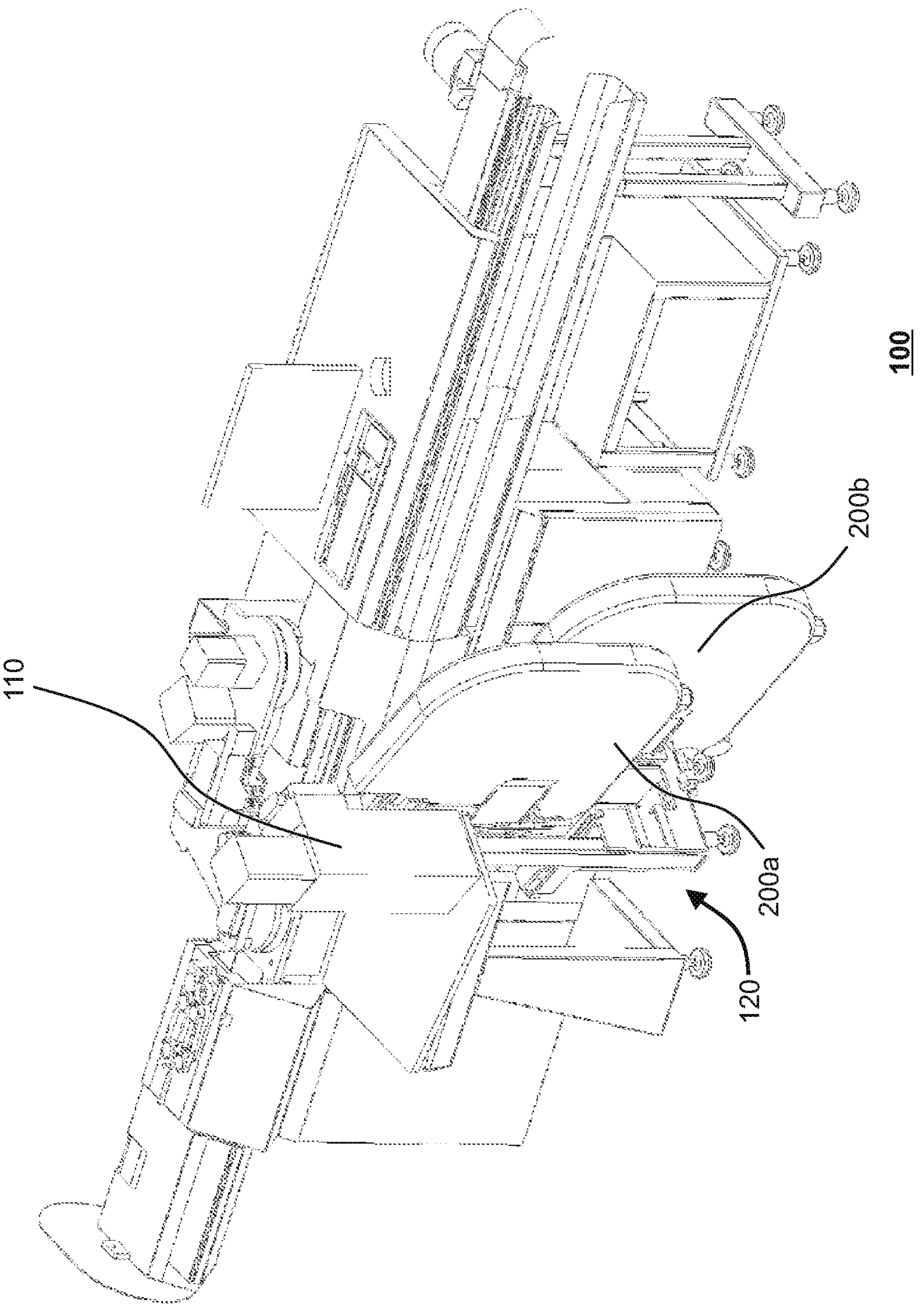
FIG. 1 is a perspective view of a cable processing apparatus according to an embodiment of the present disclosure.

FIG. 1 is a perspective view of a cable processing apparatus 100 according to an embodiment of the present disclosure. FIG. 1 provides an overview of the parts to be described in the following in more detail. In FIG. 1, the cable processing apparatus 100 has a crimping device 110 attached to it. The crimping device 110 comprises e. g. a crimping press, and it is loadable with exchangeable crimping cassettes 200*a*, 200*b*, each crimping cassette 200*a*, 200*b* comprising a reel of crimping elements, such as crimping contacts. For loading a crimping cassette 200*a*, 200*b* to the crimping device 110, it has to be taken into a proper position with respect to the crimping device 110 and attached in an operable or working manner to the crimping device 110, i. e. lifted to the crimping device 110.

Figure 2:
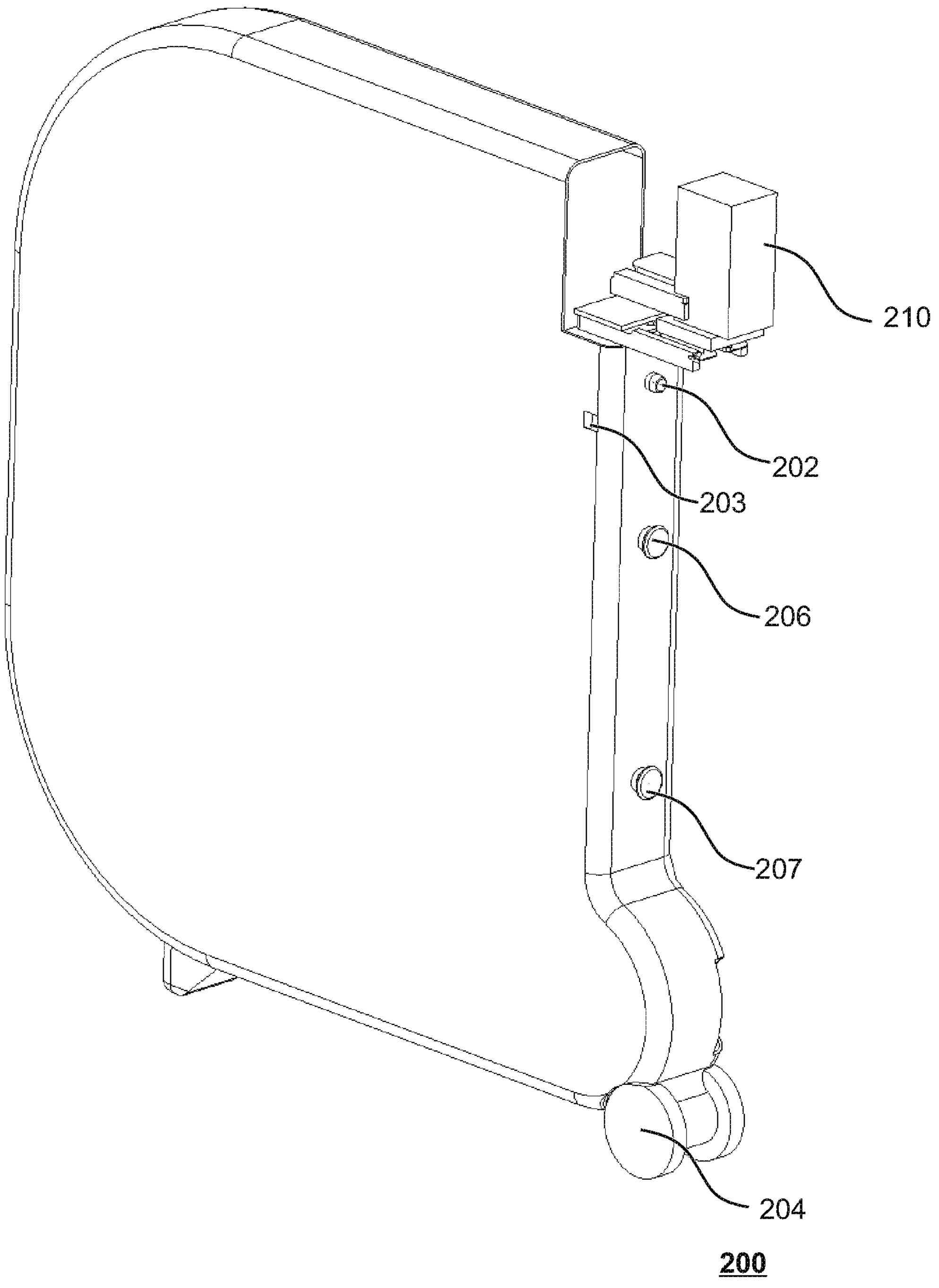
FIG. 2 is a perspective view of an exemplary crimping cassette useable in connection with the cable processing apparatus of FIG. 1.

FIG. 2 illustrates, in a perspective view, an exemplary crimping cassette 200 to be used with a cable processing apparatus 100 of an embodiment. Each of the crimping cassettes 200*a*, 200*b* may be configured as a general crimping cassette 200 of FIG. 2. The crimping cassette 200 comprises a roller 204 for rolling it to and from a proper position of the cable processing apparatus 100 as described in more detail below.

A crimping tool 210 may be attached to the crimping cassette 200. In a loading operation to the crimping device, the crimping tool 210 is inserted into the crimping press of the crimping device 110.

The crimping cassette 200 comprises an indentation 203 on each of its sides (one of them not shown in the perspective view of FIG. 2) for mating with corresponding parts of a clamping bracket, which is described in more detail below. Furthermore, the crimping cassette 200 comprises a centering bolt 202 for centering the cassette 200 in a proper position in the crimping device 110. Here, centering may refer to a general alignment procedure of the cassette 200 to achieve a proper alignment or arrangement. Moreover, the crimping cassette 200 is provided with an upper holding bolt 206 and a lower holding bolt 207 for clamping the cassette to a corresponding clamping holder, as described in more detail below.

Figure 3:
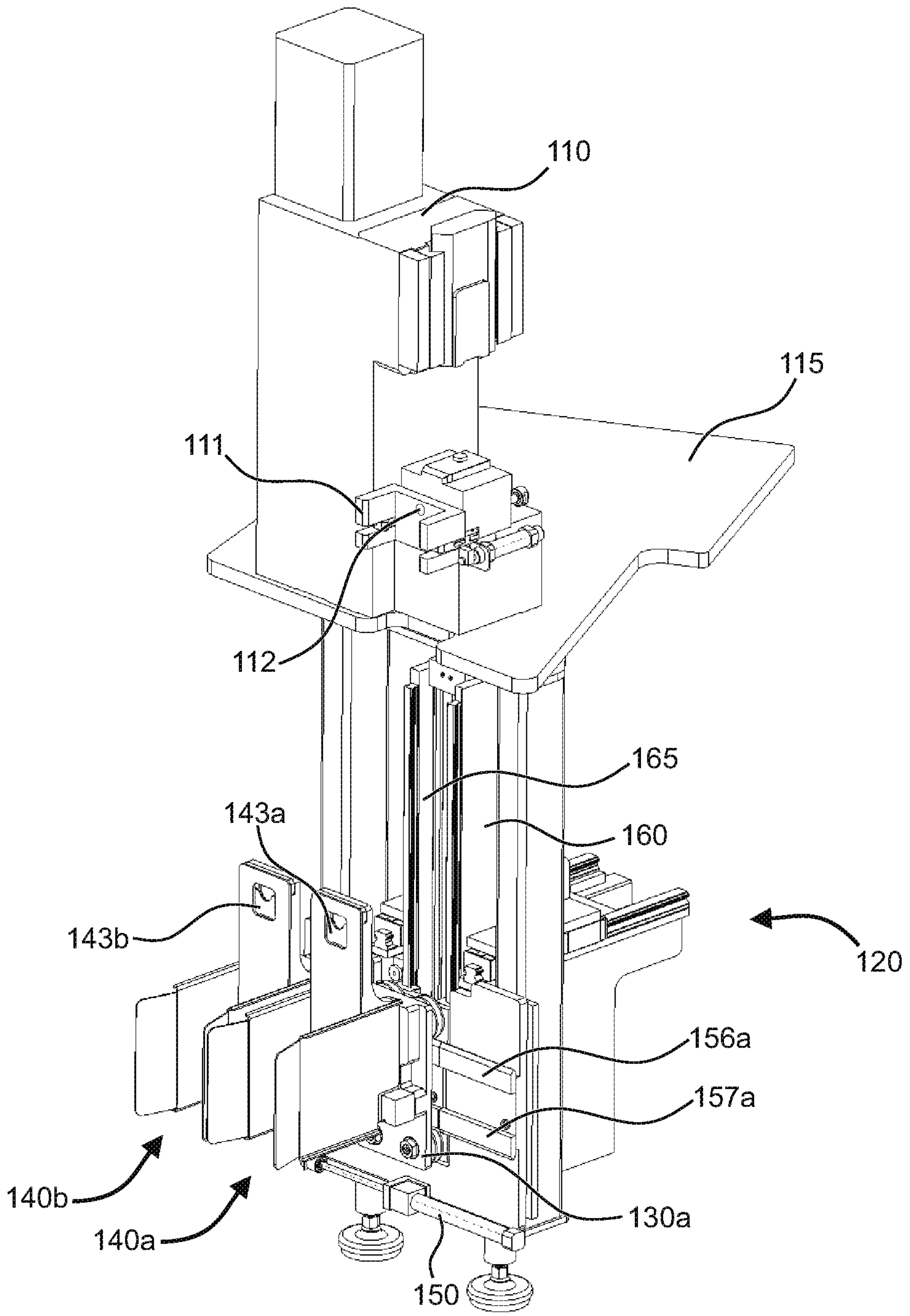
FIG. 3 is a perspective detailed view of parts of the cable processing apparatus of FIG. 1.

FIG. 3 shows, in a perspective view, a crimping cassette exchanging device 120 in relation with the crimping device 110. The crimping cassette exchanging device 120 is located below a supporting table 115 of the crimping device 110.

The crimping device 110 comprises the crimping press, and a locking device 111 for releasably locking a loaded crimping cassette. The locking device 111 comprises a centering hole 112 for mating with a corresponding centering counterpart on the crimping cassette.

The crimping cassette exchanging device 120 comprises a pair of first horizontal guiderails 156*a*, 156*b* and a pair (not shown in FIG. 3) of second horizontal guiderails 157*a*, 157*b* arranged such that a horizontal gap 158 (see FIG. 5) is present in between the pair of first horizontal guiderails 156*a*, 156*b* and the pair of second horizontal guiderails 157*a*, 157*b*. The horizontal guiderails 156*a*, 156*b*, 157*a*, 157*b* constitute a horizontal carriage guide. Substantially in the same vertical plane, and crossing the horizontal gap 158, there is a vertical carriage guide 165.

A carriage 130*a* and a carriage 130*b* (partially hidden in FIG. 3 and better recognizable in FIG. 4) are each provided with a pair of casters or rollers. The carriages 130*a*, 130*b* can be moved in the horizontal direction along the horizontal carriage guide. In FIG. 3, both the carriage 130*a* and the carriage 130*b* are at a vertical level substantially corresponding to a ground level of a crimp cassette to be attached.

Each of the carriages 130*a*, 130*b* is provided with a crimping cassette holding device 140*a*, 140*b* for attaching to a crimp cassette. The crimping cassette holding devices

140*a*, 140*b* each comprise a shifting plate 143*a*, 143*b* for establishing a clamping operation, as described below in more detail.

A carriage shifting device 150 in the embodiment of FIG. 3 comprises a pneumatic drive, such as a double-action pneumatic cylinder, which can be controlled to move, or shift, the carriages 130*a*, 130*b* in the horizontal direction along the horizontal carriage guide. Likewise, a carriage lifting device 160 in the embodiment of FIG. 3 comprises a pneumatic drive, such as a rodless pneumatic cylinder, which can be controlled to move, or shift, the carriages 130*a*, 130*b* in the vertical direction along the vertical carriage guide 165. These are examples, and one or both of the carriage shifting device 150 and the carriage lifting device 160 may comprise drives other than pneumatic drives, e. g. linear electric drives.

Figure 4:
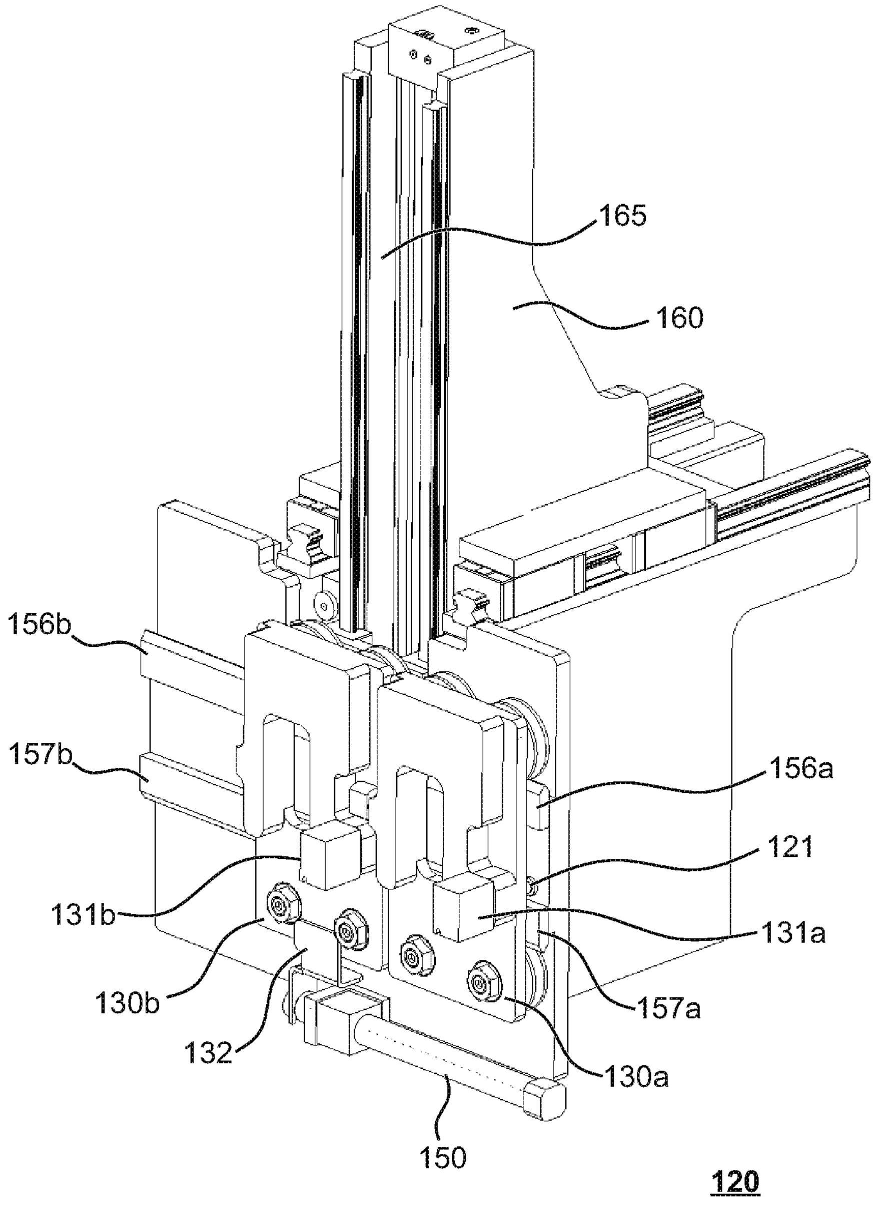
FIG. 4 is a perspective detailed view of parts of the cable processing apparatus of FIG. 1.

FIG. 4 is a perspective view showing the crimping cassette exchanging device 120 of FIG. 3. In FIG. 4, the crimping cassette holding devices 140*a*, 140*b* are not shown for convenience. Each of the carriages 130*a*, 130*b* comprises an arresting device 131*a*, 131*b*, which can be controlled to mate with a corresponding counterpart, e. g. an opening, provided on the carriage lifting device 160.

In addition, counterparts such as openings 121, 122 for the arresting devices 131*a*, 131*b* can also be provided on fixed parts of the crimping cassette exchanging device 120. The carriages 130*a*, 130*b* which are not lifted at a specific point in time when another carriage has been lifted, such as the carriage 130*a* of FIG. 5 to be discussed below, can be locked into its position by the arresting device 131*a* being inserted into the opening 121, which can be helpful to prevent an undesirable horizontal movement of the carriage 130*a* in question. Thus, the carriages which remain in an unlifted position at a certain point in time can be blocked or locked in place, and the carriage which is lifted and finally brought back to its initial vertical position can be coupled to the unlifted carriages in a reliable manner.

In FIG. 4, the carriage 130*b* has been brought, or shifted, into a position in which it can be moved, by means of the carriage lifting device 160, towards the crimping device. This position is an initial vertical position, and from this position, the carriage 130*b* is vertically moveable. A catch device 132 is provided to transmit the horizontal movement of the double-action pneumatic cylinder of the carriage shifting device 150 to the carriage 130*b*. As an example, the catch device 132 is configured with a gripping section which is bifurcated in the downward direction. The two arms of the gripping section are configured to engage with a part of the plunger of the pneumatic cylinder. When the carriage 130*b* is lifted by the carriage lifting device 160, the two arms of the gripping section disengage from the plunger, such that the upward movement of the carriage 130*b* is not adversely affected by the catch device 132.

Figure 5:
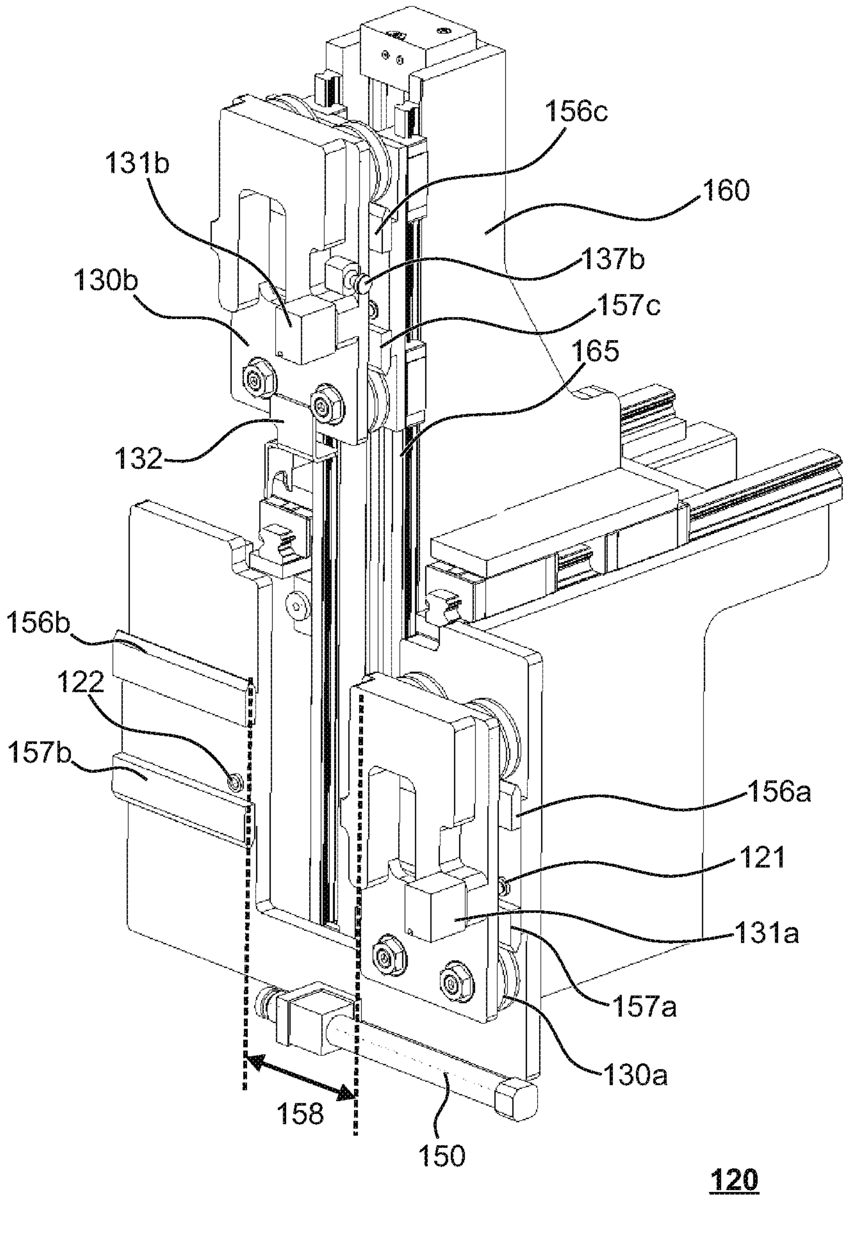
FIG. 5 is a perspective detailed view of parts of the cable processing apparatus of FIG. 1.

FIG. 5 is a perspective view corresponding to FIG. 4, where the carriage 130*b* has been lifted, or vertically moved, out of its initial vertical position. As can be seen in FIG. 5, the carriage 130*b*, as each of the plurality of carriages, is provided with intermediate elements 156*c*, 157*c* of the first horizontal guiderail and the second horizontal guiderail, respectively.

In the initial vertical position, e. g. of FIGS. 3 and 4, the carriages 130*a*, 130*b* can be guided, or shifted, in rolling engagement via the intermediate elements 156*c*, 157*c*. Particularly when more than two carriages 130*a*, 130*b* are coupled with each other at the time when the carriage lifting device 160 has brought all carriages 130*a*, 130*b* into the initial vertical position, the entire chain of more than two carriages 130*a*, 130*b* can be moved, in the horizontal direction, along the paths composed of the first horizontal guiderails 156*a*, 156*b* with the intermediate element 156*c* arranged in the horizontal gap 158 between the guiderails 156*a*, 156*b*, and the second horizontal guiderails 157*a*, 157*b* with the intermediate element 157*c* arranged in the horizontal gap 158 between the guiderails 157*a*, 157*b*. Thereby, the horizontal gap 158 is bridged by the intermediate elements 156*c*, 157*c*. It is noted that the intermediate elements 156*c*, 157*c* are configured and arranged such that the upward and downward movement of the carriage 130*a*, 130*b* to be lifted or lowered is not negatively affected, e. g. by providing a sufficient space between the horizontal ends of the intermediate elements 156*c*, 157*c* and their respective opposite horizontal ends of the horizontal guiderails 156*a*, 156*b* and 157*a*, 157*b*.

Figure 6:
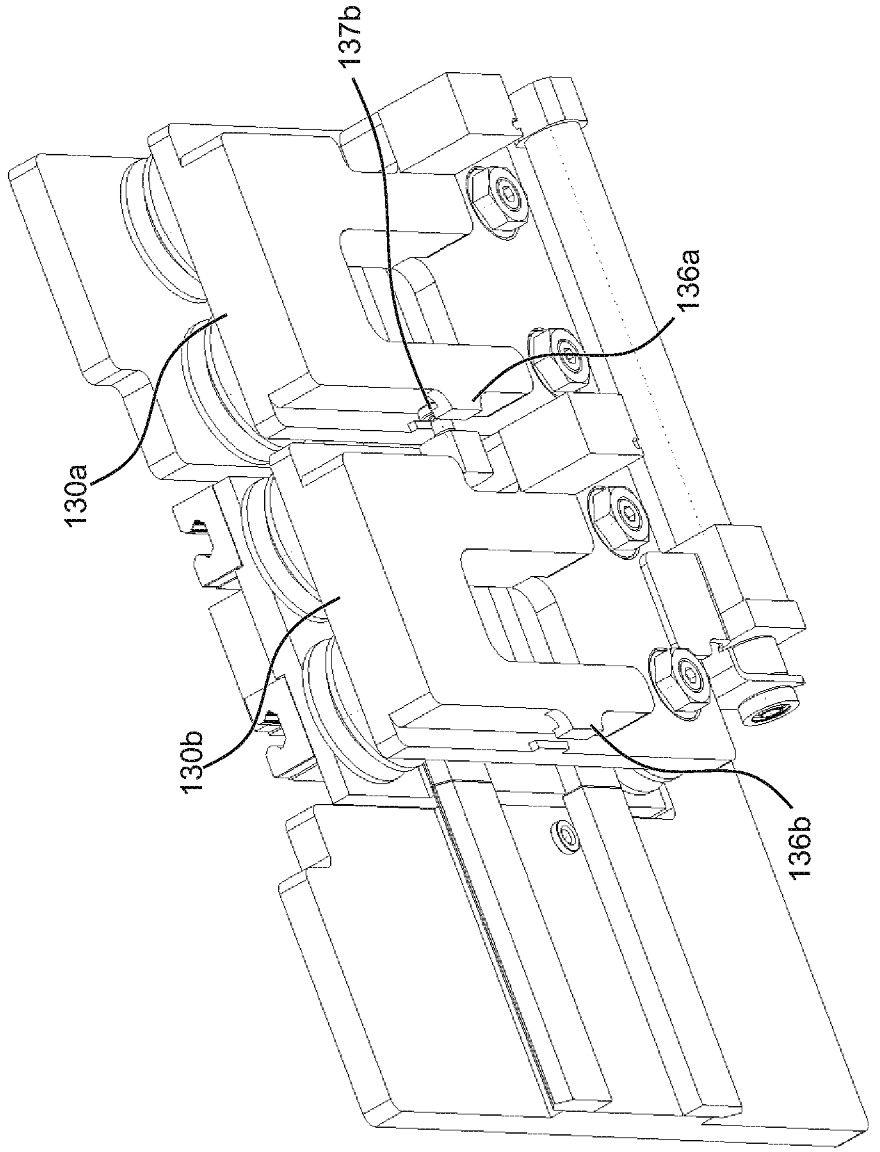
FIG. 6 is a perspective detailed view of parts of the cable processing apparatus of FIG. 1.

As shown in more detail in the perspective partial view of FIG. 6, each of the carriages 130*a*, 130*b* comprises a first part 136*a*, 136*b* of a coupling mechanism and a second part 137*b* of a coupling mechanism. The first parts 136*a*, 136*b* are designed such that they mate with a neighboring second part 137*b* to transmit a movement in the horizontal direction from one carriage 130*a* to a neighboring carriage 130*b*. In other words: The first parts 136*a*, 136*b* and the second parts 137*b* form corresponding counterparts of the coupling mechanism.

In this way, a horizontal chain of carriages can be established having a desired length, such as a chain of two, three, four or even more carriages. Initially, some or each of the carriages of the chain may have a crimping cassette 200 attached thereto, wherein the crimping cassettes 200 may each comprise a different crimping tool 210, a different crimping contact, or both.

In FIG. 6, as an example, the respective second parts 137*b* are designed as coupling bolts which mate with a suitable matching profile of the respective first parts 136*a*, 136*b*. When moved in the vertical direction, the first parts 136*a*, 136*b* detach from their corresponding second parts 137*b*, allowing an unhindered movement in the horizontal direction.

Figure 7:
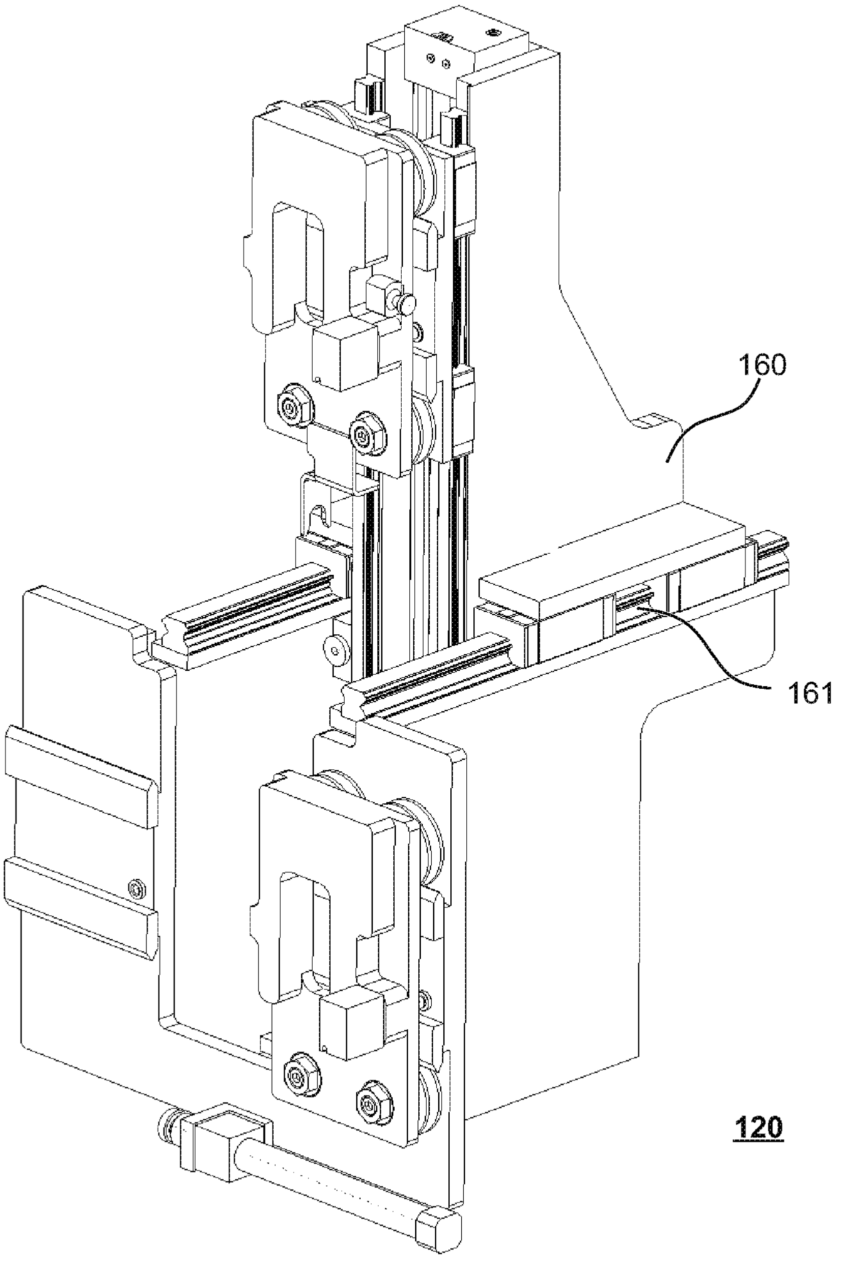
FIG. 7 is a perspective detailed view of parts of the cable processing apparatus of FIG. 1.

FIG. 7 shows a variant of FIG. 5, where the carriage lifting device has been moved, while having lifted a carriage, towards the crimping device (not shown in FIG. 7) on a carriage lifting device guiderail 161. This may help to facilitate the handling of a crimping cassette to be loaded to or unloaded from the crimping device 110.

Figure 8:
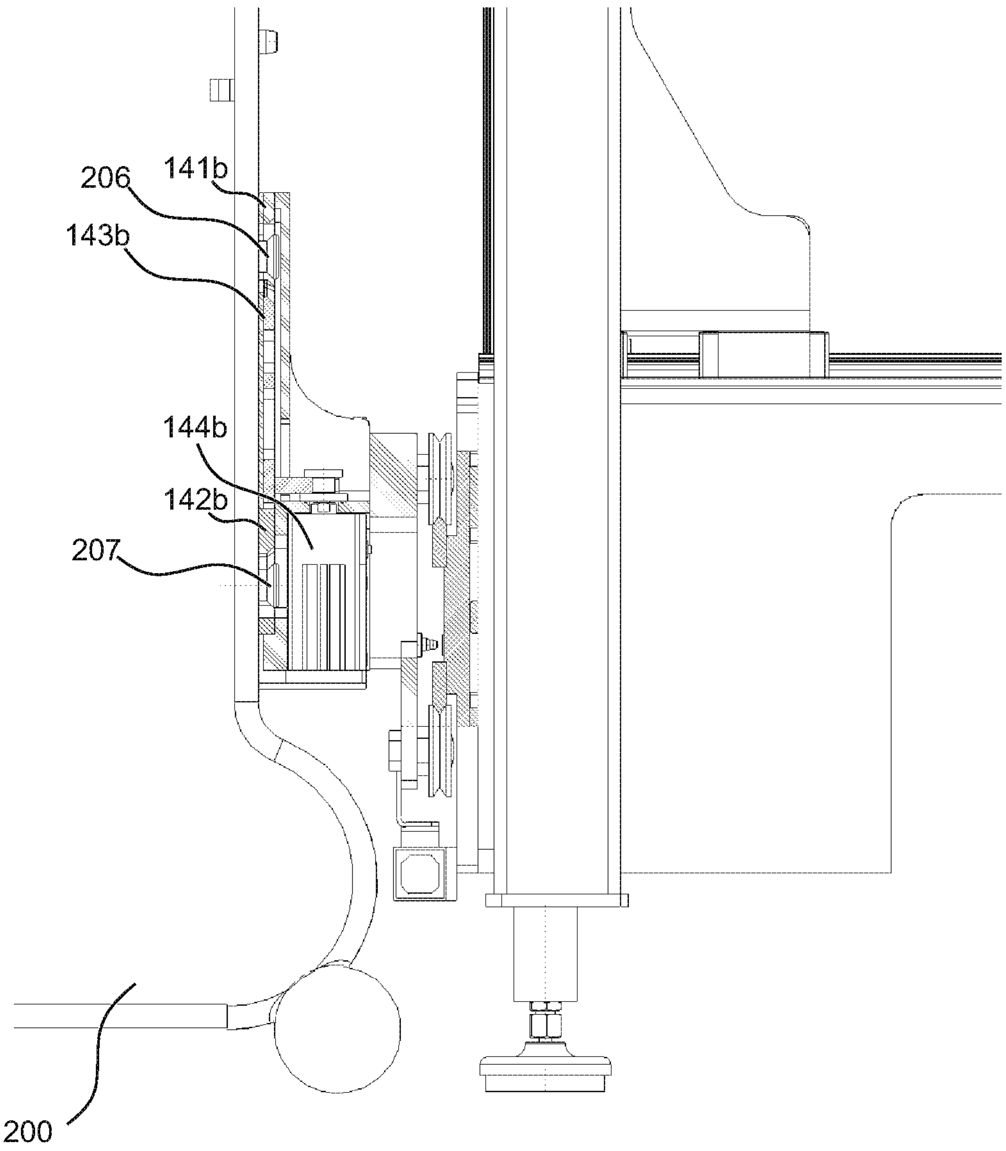
FIG. 8 is a sectional side view of parts of the cable processing apparatus of FIG. 1 and parts of the crimping cassette of FIG. 2.

FIG. 8 illustrates, in a sectional side view, parts of the crimping cassette exchanging device 120 and parts of the crimping cassette 200 according to an embodiment.

In FIG. 8, the shifting plate 143*b* of the crimping cassette holding device 140*b* is an unlock position. In the unlock position, the upper clamping holder 141*b* and the lower clamping holder 142*b* of the shifting plate 143*b* are released with respect to the upper holding bolt 206 and the lower holding bolt 207 of the crimping cassette 200, respectively. In this position, the crimping cassette 200 has ground contact and is removable from the crimping cassette holding device 140*b*, for example in order to refill the crimping contacts, to replace it by another crimping cassette 200 and the like.

Figure 9:
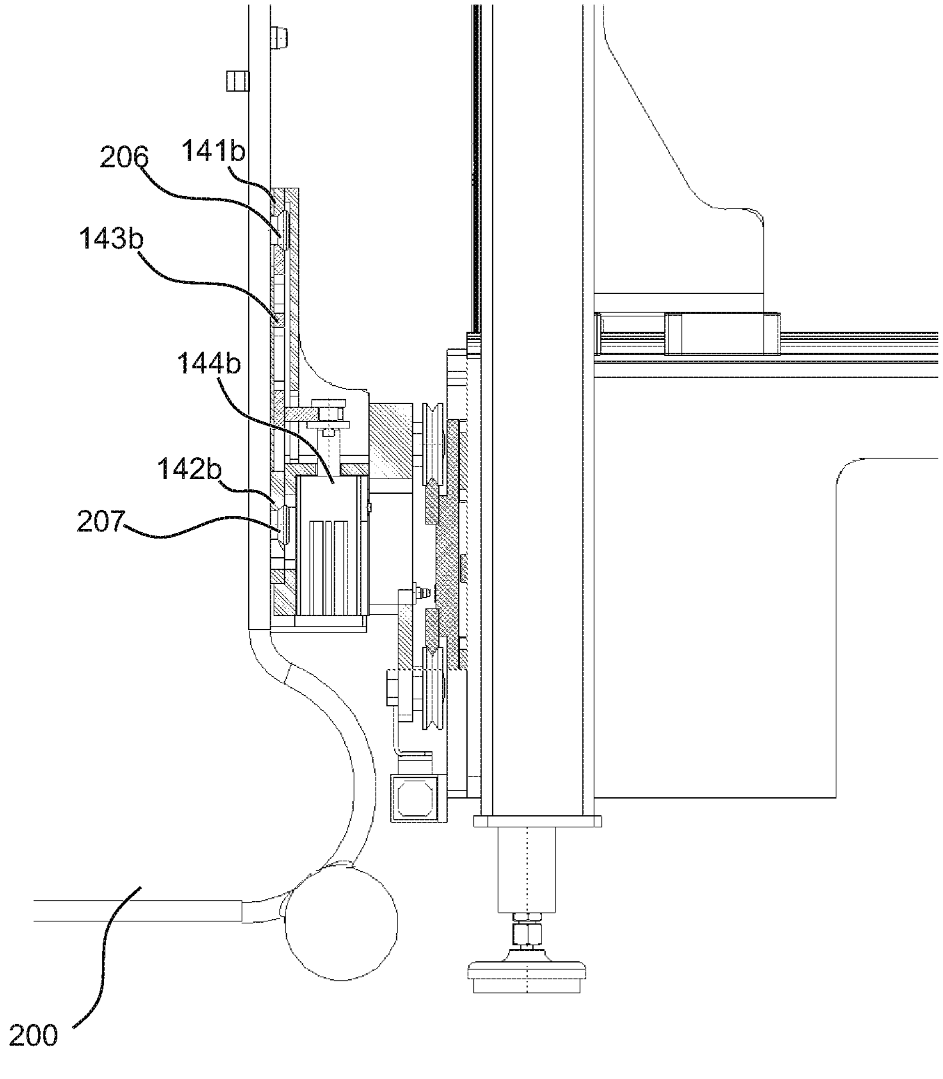
FIG. 9 is a sectional side view of parts of the cable processing apparatus of FIG. 1 and parts of the crimping cassette of FIG. 2.

By means of a clamping cylinder 144*b*, e. g. a pneumatic cylinder, the shifting plate 143*b* is selectably moveable vertically into a clamping position, which is shown in FIG. 9. Here, the upper clamping holder 141*b* engages the upper holding bolt 206, and the lower clamping holder 142 engages the lower holding bolt 207. Selecting the unlock position and the clamping position may be performed manually by a switch, or automatically, e. g. by means of a sensor device or the like.

In the clamping position, the crimping cassette 200 is slightly lifted, such that—while still being close to the ground—it is freely moveable in the horizontal direction together with the movement of the carriage 130*b* which it is attached to. The shifting plate 143*b* is shaped such that both the upper holding bolt 206 and the lower holding bolt 207 are aligned in the sideways direction.

Figure 10:
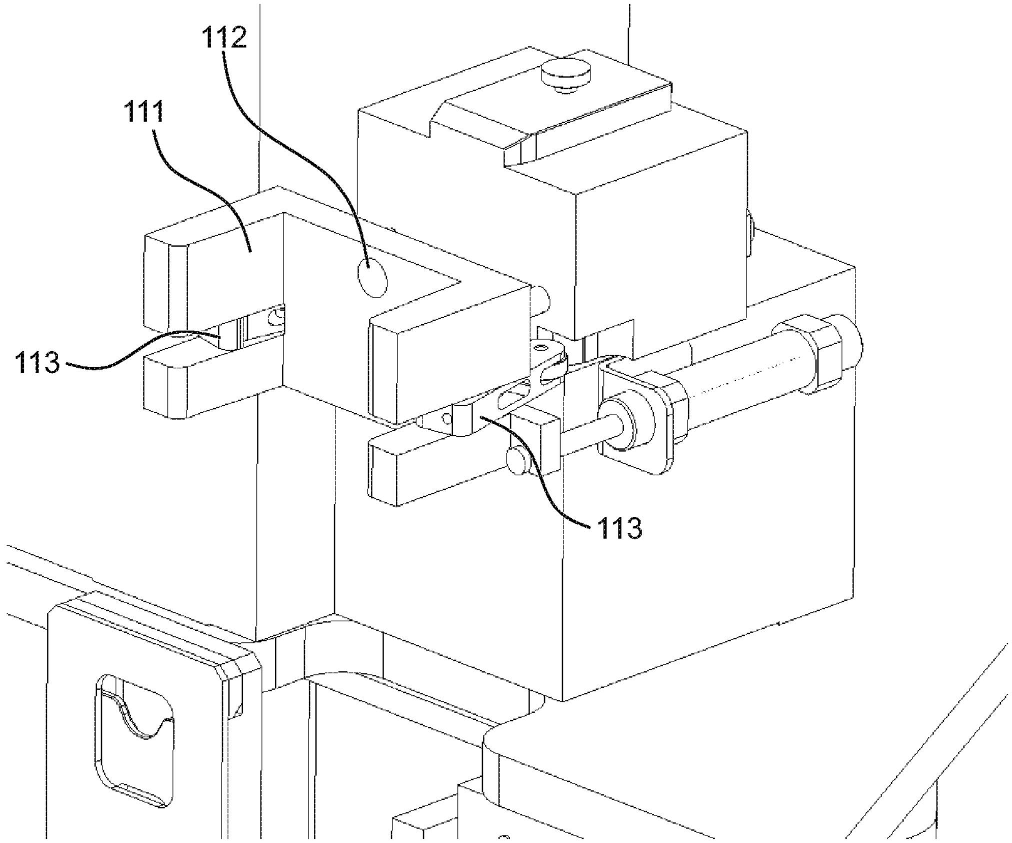
FIG. 10 is a perspective detailed view of parts of the cable processing apparatus of FIG. 1.

FIG. 10 shows, in a perspective illustration, a detailed view of the locking device 111. Further to the centering hole 112, the locking device 111 is provided with brackets 113 on each of the sides of the locking device.

Figure 11:
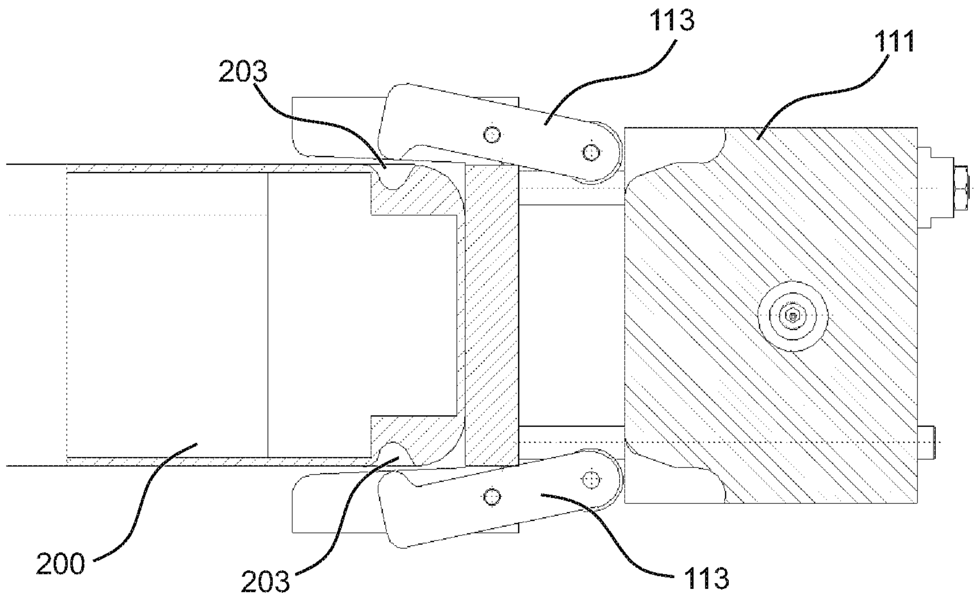
FIG. 11 is a sectional top view of parts of the cable processing apparatus of FIG. 1 and parts of the crimping cassette of FIG. 2.
Figure 12:
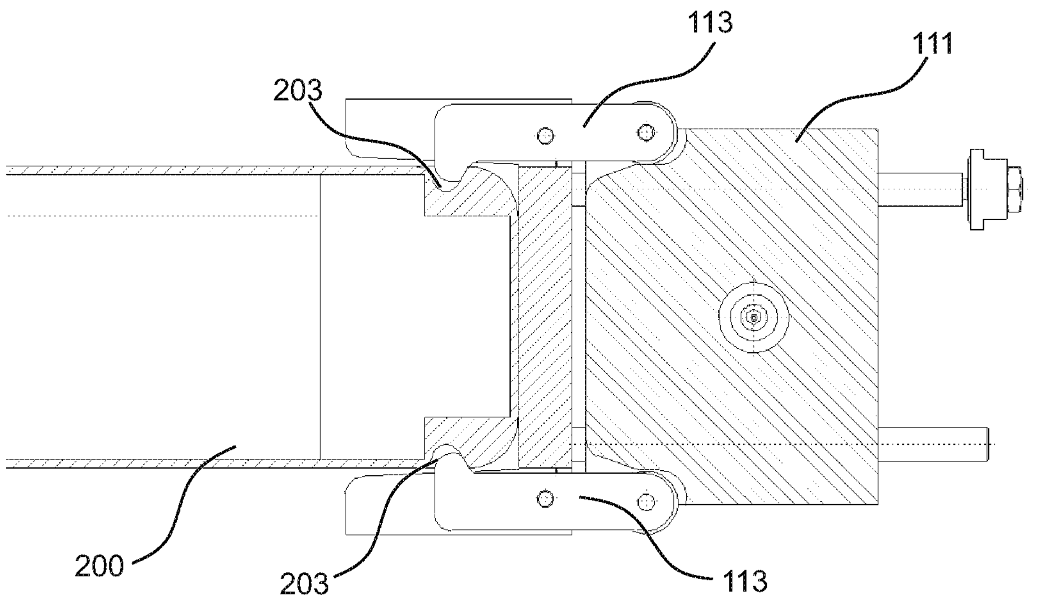
FIG. 12 is a sectional top view of parts of the cable processing apparatus of FIG. 1 and parts of the crimping cassette of FIG. 2.

FIGS. 11 and 12 show, each in a sectional top view, the locking device 111 and parts of a cassette 200 relative to the locking device 111. In FIG. 11, the brackets are in an open position, allowing the cassette 200 to be moved to and from the locking device. A centering bolt provided on the crimping cassette (not shown) mates with the centering hole 112 (not shown in FIGS. 11 and 12) of the locking device 111, such that the cassette 200 is centered and aligned. In FIG. 12, the brackets 113 are closed, and each bracket 113 engages with one of the indentations 203 provided laterally on the cassette 200. Thereby, the brackets 113 push the cassette 200 towards the locking device 111 and have it tightly fixed thereon.

The locking device 111 is guided, in the horizontal direction, by means of guiding rods (not shown) and can be moved away from the crimping press, e. g. by a pneumatic cylinder.

In this state, the brackets 113 are brought into the open or unlocked position, e. g. by torsion springs. In this open state, the cassette 200 may be moved to or from the locking device, e. g. by the horizontal movement of the carriage lifting device 160 on the carriage lifting device guiderail 161.

For example, the force limit of the device which performs the movement of the locking device 111 is higher than the force limit of the device which performs the horizontal movement of the carriage lifting device 160. The locking device 111 then serves as a mechanical stop for this horizontal movement. In a subsequent retraction movement of the locking device 111, the carriage lifting device 160 continues its movement, and the cassette 200 is brought into its final position. Then, parts of the brackets 113 come into contact with a control surface of the press of the crimping device 110, such that the brackets 113 are closed.

Although the invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A cable processing apparatus (100) having a crimping device (110) loaded with an exchangeable crimping cassette (200, 200*a*, 200*b*), the cassette having a crimping tool attached thereto, the cable processing apparatus (100) comprising a crimping cassette exchanging device (120), wherein the crimping cassette exchanging device (120) comprises:

a plurality of carriages (130*a*, 130*b*), each carriage (130*a*, 130*b*) having a crimping cassette holding device (140*a*, 140*b*) adapted to attach to and to detach from a crimping cassette (200, 200*a*, 200*b*);

a horizontal carriage guide for providing a substantially horizontal guided movement of the carriages (130*a*, 130*b*);

a vertical carriage guide (165) for providing a substantially vertical guided movement of a carriage (130*a*, 130*b*) from an initial vertical position to the crimping device (110) or vice-versa, wherein the vertical carriage guide (165) is arranged relative to the horizontal carriage guide such that one of the plurality of carriages (130*a*, 130*b*) is vertically movable at a time;

a carriage shifting device (150) adapted to controllably perform the horizontal guided movement;

a carriage lifting device (160) adapted to controllably perform the vertical guided movement;

wherein the cable processing apparatus further comprises a control device adapted to control the horizontal guided movement or the vertical guided movement according to a carriage selection signal.

2. The cable processing apparatus (100) according to claim 1, the carriages (130*a*, 130*b*) each comprising a coupling mechanism (136*a*, 136*b*, 137*b*) having mutually matching counterparts to couple to neighboring ones when each of the respective neighboring carriages (130*a*, 130*b*) is in its respective initial vertical position, wherein the coupling mechanism (136*a*, 136*b*, 137*b*) is designed such that the counterparts are detached from one another when any one of the neighboring carriages (130*a*, 130*b*) is lifted from its respective initial vertical position.

3. The cable processing apparatus (100) according to claim 2, wherein the horizontal carriage guide comprises at least one first horizontal guiderail (156*a*, 156*b*) and at least one second horizontal guiderail (157*a*, 157*b*) arranged such that a horizontal gap (158) is provided in between the horizontal guiderails (156*a*, 157*a*, 156*b*, 157*b*) in the horizontal direction, the vertical carriage guide (165) being arranged such that it extends, at least partially, through the horizontal gap.

4. The cable processing apparatus (100) according to claim 3, wherein the gap width of the horizontal gap substantially corresponds to a total width of a carriage (130*a*, 130*b*) in the horizontal direction.

5. The cable processing apparatus (100) according to claim 1, wherein the crimping cassette holding device (140*a*, 140*b*) comprises at least one clamping holder (141*a*, 141*b*, 142*a*, 142*b*) for attaching to the crimping cassette (200, 200*a*, 200*b*).

6. The cable processing apparatus (100) according to claim 5, wherein the clamping holder (141*a*, 141*b*, 142*a*, 142*b*) is adapted to lift the crimping cassette (200, 200*a*, 200*b*) for establishing the attachment.

7. The cable processing apparatus (100) according to claim 1, wherein the carriage shifting device (150) and/or the carriage lifting device (160) is operated pneumatically.

8. The cable processing apparatus (100) according to claim 1, wherein the carriage shifting device (150) and/or the carriage lifting device (160) is operated electrically.

9. The cable processing apparatus (100) according to claim 1, wherein each carriage (130*a*, 130*b*) comprises an arresting device (131*a*, 131*b*) for releaseably arresting at least one carriage (130*a*, 130*b*) with the carriage lifting device (160).

10. The cable processing apparatus (100) according to claim 1, wherein the crimping device (110) comprises a locking device (111) for releaseably locking the loaded crimping cassette (200, 200*a*, 200*b*).

11. The cable processing apparatus (100) according to claim 10, wherein the locking device (111) comprises a centering unit for centering the loaded crimping cassette, typically a centering hole (112) for mating with a corresponding centering bolt (202) of the crimping cassette (200, 200*a*, 200*b*).

* * * * *